United States Patent
Sumi

(10) Patent No.: US 9,257,111 B2
(45) Date of Patent: Feb. 9, 2016

(54) MUSIC ANALYSIS APPARATUS

(71) Applicant: YAMAHA CORPORATION, Hamamatsu-shi, Shizuoka-ken (JP)

(72) Inventor: Kouhei Sumi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 93 days.

(21) Appl. No.: 13/895,559

(22) Filed: May 16, 2013

(65) Prior Publication Data

US 2013/0305904 A1    Nov. 21, 2013

(30) Foreign Application Priority Data

May 18, 2012  (JP) ................. 2012-115064

(51) Int. Cl.
| | | |
|---|---|---|
| G10H 7/00 | (2006.01) | |
| G10H 1/00 | (2006.01) | |
| G09B 15/00 | (2006.01) | |
| G09B 15/02 | (2006.01) | |

(52) U.S. Cl.
CPC ............ *G10H 1/0008* (2013.01); *G09B 15/023* (2013.01); *G10H 1/00* (2013.01); *G10H 1/0041* (2013.01); *G10H 7/00* (2013.01); *G10H 2210/066* (2013.01); *G10H 2210/091* (2013.01); *G10H 2240/141* (2013.01)

(58) Field of Classification Search
CPC .................................. G10H 7/00; G10H 1/00
USPC ................................. 84/609, 477 R
See application file for complete search history.

(56) References Cited

U.S. PATENT DOCUMENTS

| | | | | |
|---|---|---|---|---|
| 5,874,686 A * | 2/1999 | Ghias | ................ | G06F 17/30743 84/609 |
| 6,107,559 A * | 8/2000 | Weinstock | ............... | G10G 3/04 84/470 R |
| 6,921,855 B2 * | 7/2005 | Tanaka | ..................... | G10G 1/00 84/477 R |
| 7,179,982 B2 * | 2/2007 | Goto | ........................ | G10D 1/00 348/465 |
| 7,273,978 B2 * | 9/2007 | Uhle | ........................ | G10H 1/40 84/609 |
| 7,812,240 B2 * | 10/2010 | Streich | ................. | G10H 1/0025 84/609 |
| 7,829,777 B2 * | 11/2010 | Kyuma | .................. | G10H 1/368 84/477 R |

(Continued)

OTHER PUBLICATIONS

Kjell Lemström et al., "Including Interval Encoding into Edit Distance Based Music Comparison and Retrieval", Proc. AISB. 2000 (Eight (8) pages).

*Primary Examiner* — Elvin G Enad
*Assistant Examiner* — Christina Schreiber
(74) *Attorney, Agent, or Firm* — Crowell & Moring LLP

(57) ABSTRACT

A music analysis apparatus calculates a similarity index based on an edit distance between a designated sequence of notes designated by a user and a reference sequence of notes of a reference piece of music. The edit distance is calculated by setting a substitution cost between a first note in the designated sequence of notes and a second note in the reference sequence of notes to a first value when one of the first note and the second note corresponds to any of a plurality of notes contained in a tolerance interval containing the other of the first note and the second note, and by setting the substitution cost to a second value different from the first value when one of the first note and the second note does not correspond to any of the plurality of notes contained in the tolerance interval.

12 Claims, 7 Drawing Sheets

(56) References Cited

U.S. PATENT DOCUMENTS

| | | | | |
|---|---|---|---|---|
| 8,103,005 B2 * | 1/2012 | Goodwin | G10L 19/008 | 381/1 |
| 8,283,548 B2 * | 10/2012 | Oertl | G10H 1/0066 | 84/609 |
| 8,487,175 B2 * | 7/2013 | Arimoto | G10H 1/40 | 84/611 |
| 8,680,386 B2 * | 3/2014 | Shibuya | G06F 17/30743 | 84/609 |
| 8,853,516 B2 * | 10/2014 | Arimoto | G10H 1/0008 | 700/94 |
| 2001/0039870 A1 * | 11/2001 | Shimaya | G09B 15/023 | 74/478 |
| 2003/0177887 A1 * | 9/2003 | Tanaka | G10G 1/00 | 84/609 |
| 2004/0069123 A1 * | 4/2004 | Becker | G10H 1/00 | 84/612 |
| 2006/0117228 A1 * | 6/2006 | Theimer | G06F 17/30985 | 714/45 |
| 2007/0143108 A1 * | 6/2007 | Kurozumi | G06F 17/30743 | 704/239 |
| 2011/0259179 A1 * | 10/2011 | Oertl | G10H 1/0066 | 84/609 |
| 2012/0259637 A1 * | 10/2012 | Srinivas | G06F 17/30758 | 704/239 |
| 2013/0192445 A1 * | 8/2013 | Sumi | G10H 1/0008 | 84/609 |
| 2014/0020546 A1 * | 1/2014 | Sumi | G10H 1/0008 | 84/609 |
| 2014/0230630 A1 * | 8/2014 | Wieder | G10H 1/0008 | 84/609 |

* cited by examiner

FIG. 4
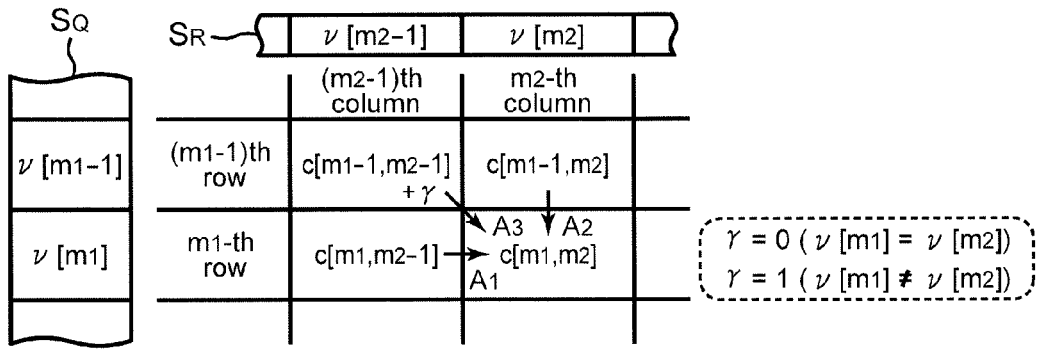
FIG. 5
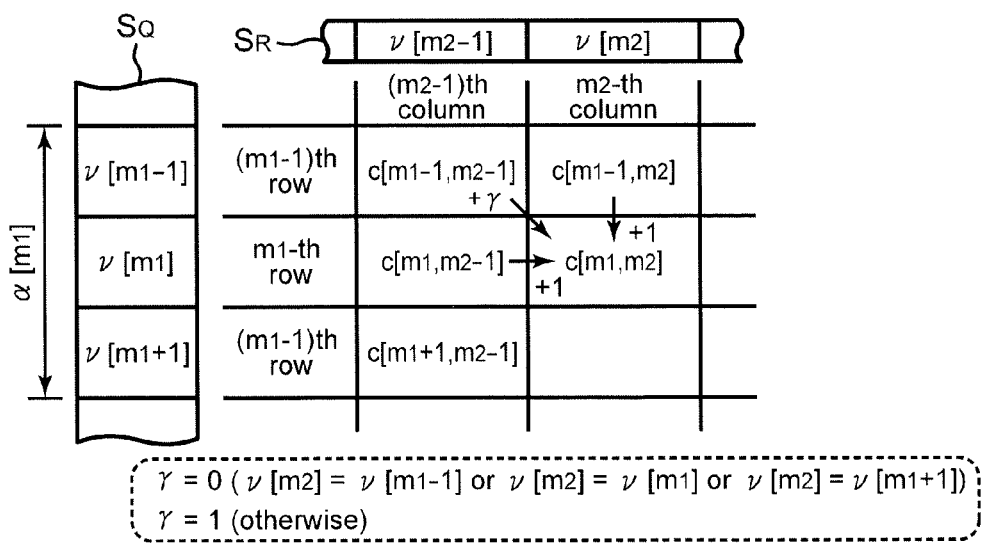
FIG. 6

FIG. 7

| $S_Q$ \ $S_R$ |   | C | G | F | E | D | C | D | C |
|---|---|---|---|---|---|---|---|---|---|
|   |   | 0 | 1 | 2 | 3 | 4 | 5 | 6 | 7 | 8 |
| C | 1 | 0 | 1 | 2 | 3 | 4 | 5 | 6 | 7 |
| E | 2 | 1 | 0 | 1 | 2 | 3 | 4 | 5 | 6 |
| G | 3 | 2 | 1 | 1 | 1 | 2 | 3 | 4 | 5 |
| D | 4 | 3 | 2 | 1 | 2 | 1 | 2 | 3 | 4 |
| F | 5 | 4 | 3 | 2 | 2 | 2 | 1 | 2 | 3 |
| C | 6 | 5 | 4 | 3 | 2 | 3 | 2 | 2 | 2 |
| E | 7 | 6 | 5 | 4 | 3 | 3 | 3 | 3 | 2 | → E |

(rightmost column marked C)

FIG. 8

< ANALYSIS RESULT >

1. MUSIC AAA
2. MUSIC BBB
3. MUSIC CCC
   ⋮

FIG. 9

| $S_Q$ \ $S_R$ | | $\nu[m2-1]$ | $\nu[m2]$ | $\nu[m2]$ |
|---|---|---|---|---|
| | | $(m2-1)$th column | $m2$-th column | $(m2+1)$th column |
| $\nu[m1-1]$ | $(m1-1)$th row | $c[m1-1, m2-1]$ $+\gamma$ | $c[m1-1, m2]$ $\downarrow +1$ | $c[m1-1, m2+1]$ |
| $\nu[m1]$ | $m1$-th row | $c[m1, m2-1]$ → | $c[m1, m2]$ $+1$ | | with $\alpha[m2]$ spanning the top.

$\gamma = 0 \ (\nu[m1] = \nu[m2-1] \text{ or } \nu[m1] = \nu[m2] \text{ or } \nu[m1] = \nu[m2+1])$
$\gamma = 1 \text{ (otherwise)}$

| CONFIGURATION | Average rank | top1 rate[%] | top3 rate[%] | top5 rate[%] |
|---|---|---|---|---|
| CONFIGURATION 1 (Y[n]) | 10.36 | 67.3 | 75.3 | 82.7 |
| CONFIGURATION 2 (X[n]/margin:0) | 4.73 | 70.7 | 80.0 | 86.0 |
| CONFIGURATION 3 (X[n]/margin:3) | 3.00 | 77.3 | 87.3 | 90.0 |
| CONFIGURATION 4 (X[n]+Y[n]/margin:0) | 1.85 | 81.3 | 94.0 | 95.3 |
| CONFIGURATION 5 (X[n]+Y[n]/margin:3) | 1.35 | 89.3 | 96.0 | 98.0 |

MUSIC ANALYSIS APPARATUS

BACKGROUND OF THE INVENTION

1. Technical Field of the Invention

The present invention relates to technology for analyzing a correlation between a time series of a plurality of notes (hereinafter, referred to as a 'designated sequence of notes') designated by a user and a piece of music.

2. Description of the Related Art

A technology for searching a plurality of pieces of music (hereinafter, referred to as 'reference pieces of music') for a target piece of music including a designated sequence of notes has been proposed. For example, non-patent reference 1 discloses a technology for computing an edit distance (Levenshtein distance) between a designated sequence of notes and a sequence of notes included in a reference piece of music (referred to as 'reference sequence of notes' hereinafter) as a similarity between the designated sequence of notes and the reference sequence of notes for each reference piece of music and searching for a reference piece of music (that is, a piece of music intended by a user) correlated with the designated sequence of notes on the basis of similarity of each reference piece of music.

[Non-Patent Reference 1] K. Lemstrom and E. Ukkonen, "Including Interval Encoding into Edit Distance Based Music Comparison and Retrieval", Proc. AISB. 2000

A user sequentially designates notes of a designated sequence of notes by manipulating manipulators of an electronic musical instrument. It is possible to designate a chord as a designated sequence of notes by simultaneously manipulating a plurality of manipulators of the electronic musical instrument. However, although the user intends to simultaneously manipulate a plurality of manipulators, the manipulators are manipulated at different points of time in practice. Accordingly, even if the user designates the same chord, the order of tones of the chord may be changed. For example, though the user intends to designate a chord of "do, mi, so", various note rows such as "do, so, mi", "mi, do, so", "so, do, mi", etc. may be designated as designated sequences of notes. Accordingly, an error in the order of notes designated by the user affects a result of analysis of a similarity between a designated sequence of notes and a reference sequence of notes. While a case in which the order of tones of a chord is changed is considered in the above description, the order of notes may be changed according to user error.

SUMMARY OF THE INVENTION

In view of this, an object of the present invention is to analyze a correlation (similarity) between a designated sequence of notes and a reference sequence of notes robustly against variation in the order of notes in the designated sequence of notes.

Means employed by the present invention to achieve the object will be described. Although, in the following description, elements of the embodiments described later corresponding to elements of the invention are referenced in parentheses for better understanding, such parenthetical reference is not intended to limit the scope of the invention to the embodiments.

A music analysis apparatus according to a first aspect of the present invention comprises: a first analyzer (e.g. first analyzer 22) configured to calculate a first similarity index (e.g. similarity index $X[n]$) based on an edit distance (e.g. edit distance E) between a designated sequence of notes (e.g. designated sequence of notes $S_Q$) designated by a user and a reference sequence of notes (e.g. reference sequence of notes $S_R$) of a reference piece of music, wherein the first analyzer calculates the edit distance by setting a substitution cost (e.g. substitution cost γ) between a first note (e.g. note $v[m1]$) in the designated sequence of notes and a second note (e.g. note $v[m2]$) in the reference sequence of notes to a first value (e.g. 0) when one of the first note and the second note corresponds to any of a plurality of notes contained in a tolerance interval (e.g. tolerance interval $\alpha[m1]$ or tolerance interval $\alpha[m2]$) containing the other of the first note and the second note, and by setting the substitution cost to a second value (e.g. 1) different from the first value when one of the first note and the second note does not correspond to any of the plurality of notes contained in the tolerance interval.

In this configuration, since the substitution cost between the first note and the second note is set based on differences between one of the first and second notes and the plurality of notes in the tolerance interval including the other of the first and second notes, it is possible to analyze a correlation (similarity) between the designated sequence of notes and the reference sequence of notes robustly against variation in the order of notes in the designated sequence of notes.

In a preferred embodiment (e.g. third embodiment described below) of the music analysis apparatus according to the first aspect of the invention, the first analyzer calculates the first similarity index based on an edit distance (e.g. edit distance $E_Q$) when the tolerance interval (e.g. tolerance interval $\alpha[m1]$) containing the first note is set in the designated sequence of notes and an edit distance (e.g. edit distance $E_R$) when the tolerance interval (e.g. tolerance interval $\alpha[m2]$) containing the second note is set in the reference sequence of notes.

According to this embodiment, since the first similarity index is calculated based on an edit distance when a tolerance interval is set in the designated sequence of notes and an edit distance when a tolerance interval is set in the reference sequence of notes, the influence of a difference between the edit distance when a tolerance interval is set in the designated sequence of notes and the edit distance when a tolerance interval is set in the reference sequence of notes can be reduced, and thus the correlation between the designated sequence of notes and the reference sequence of notes can be evaluated with high accuracy.

In a preferred embodiment of the music analysis apparatus according to the first aspect of the invention, the first analyzer calculates a plurality of basic values (e.g. basic value $x[b]$) based on a plurality of edit distances indicating respective similarities between the designated sequence of notes and a plurality of sub reference sequences of notes (e.g. target intervals σ [b]), which are sequentially selected from the reference sequence of notes such that a position of each sub reference sequence of notes shifts relative to the designated sequence of notes along a time axis, and selects a basic value indicating a maximum similarity between the sub reference sequence of notes and the designated sequence of notes as the first similarity index.

In this embodiment, since the basic value representing the maximum similarity from among a plurality of basic values calculated by changing the position of the designated sequence of notes with respect to the reference sequence of notes is selected as the first similarity index, the correlation between the designated sequence of notes and the reference sequence of notes can be appropriately evaluated even when the designated sequence of notes corresponds to only a specific part of the reference sequence of notes.

However, in a configuration using only an edit distance between sequences of notes as in the technology of non-patent reference 1, accuracy of analysis of a correlation between sequences of notes is limited. Therefore, a music analysis apparatus according to a second aspect of the present invention comprises: a first analyzer configured to calculate a first similarity index based on an edit distance between a designated sequence of notes designated by a user and a reference sequence of notes of a reference piece of music; a feature calculator configured to divide the designated sequence of notes into a plurality of unit intervals in a time domain and divide the reference sequence of notes into a plurality of unit intervals in manner parallel to the designated sequence of notes, and further configured to calculate a duration feature (e.g. duration feature TO for each unit interval based on each sum of durations of notes belonging to each of pitch classes within the unit interval and a total sum of durations of all notes belonging to the unit interval; a second analyzer (e.g. second analyzer 34) configured to calculate a second similarity index (e.g. similarity index Y[n]) by comparing a duration feature (e.g. duration feature $I_Q$) of each unit interval of the designated sequence of notes with a duration feature (e.g. duration feature $T_R$) of each unit interval of the reference sequence of notes; and an index calculator (e.g. index calculator 36) configured to calculate a third similarity index (e.g. similarity index Z[n]) based on the first similarity index calculated by the first analyzer and the second similarity index calculated by the second analyzer.

Accordingly, it is possible to evaluate the correlation between the designated sequence of notes and the reference sequence of notes with high accuracy, compared to the configuration using only the edit distance.

The music analysis apparatus according to the preferred embodiment of the first aspect of the invention comprises a music selector (e.g. music selector 42) configured to select a plurality of reference pieces of music from a plurality of candidate pieces of music, wherein the first analyzer calculates the first similarity index for each of the reference pieces of music selected by the music selector.

In this configuration, since the first analyzer calculates the first similarity index for each of the plurality of reference pieces of music selected by the music selector from the plurality of candidate pieces of music, processing load and processing time of the first analyzer are reduced, compared to a configuration for calculating the first similarity index for all the candidate pieces of music. Furthermore, the music analysis apparatus according to the preferred embodiment of the second aspect of the invention may also preferably employ a configuration in which the second analyzer calculates the second similarity index for each of the plurality of reference pieces of music selected by the music selector.

The music analysis apparatus according to the first or second aspect of the invention may not only be implemented by hardware (electronic circuitry) dedicated for music analysis, such as a digital signal processor (DSP), but may also be implemented through cooperation of a general operation processing device such as a central processing unit (CPU) with a program. A program according to the first aspect of the invention executes, on a computer, music analysis processing comprising: a first step of determining whether or not one of a first note in a designated sequence of notes designated by a user and a second note in a reference sequence of notes of a reference piece of music corresponds to any of a plurality of notes contained in a tolerance interval containing the other of the first note and the second note; a second step of setting a substitution cost between the first note and the second note to a first value when one of the first note and the second note corresponds to any of the plurality of notes contained in the tolerance interval, and setting the substitution cost to a second value different from the first value when one of the first note and the second note does not correspond to any of the plurality of notes contained in the tolerance interval; a third step of calculating an edit distance between the designated sequence of notes and the reference sequence of notes based on the substitution cost set through the first and second steps; and a fourth step of calculating a first similarity index based on the edit distance, the first similarity index indicating a degree of similarity between the designated sequence of notes and the reference sequence of notes.

According to this program, the same operation and effect as those of the music analysis apparatus according to the first aspect of the invention can be achieved.

A program according to the second aspect of the invention executes, on a computer, music synthesis processing comprising: a first step of calculating a first similarity index based on an edit distance between a designated sequence of notes designated by a user and a reference sequence of notes of a reference piece of music; a second step of dividing the designated sequence of notes into a plurality of unit intervals in a time domain and dividing the reference sequence of notes into a plurality of unit intervals in manner parallel to the designated sequence of notes, and calculating a duration feature for each unit interval based on each sum of durations of notes belonging to each of pitch classes within the unit interval and a total sum of durations of all notes belonging to the unit interval; a third step of calculating a second similarity index by comparing a duration feature of each unit interval of the designated sequence of notes with a duration feature of each unit interval of the reference sequence of notes; and a fourth step of calculating a third similarity index based on the first similarity index and the second similarity index.

According to this program, the same operation and effect as those of the music analysis apparatus according to the second aspect of the invention can be achieved.

The programs according to the first and second aspects of the present invention can be stored in a computer readable non-transitory recording medium and installed in a computer, or distributed through a communication network and installed in a computer.

BRIEF DESCRIPTION OF THE DRAWINGS

FIG. 4 illustrates each element (distance) in a distance matrix in a comparative example.

FIG. 5 illustrates an exemplary distance matrix in the comparative example in detail.

FIG. 6 illustrates each element (distance) in a distance matrix according to the first embodiment of the present invention.

FIG. 7 illustrates an exemplary distance matrix according to the first embodiment of the present invention in detail.

FIG. 8 illustrates an exemplary analysis result.

FIG. 9 illustrates each element (distance) in a distance matrix according to a second embodiment of the present invention.

DETAILED DESCRIPTION OF THE INVENTION

<First Embodiment>

Figure 1:
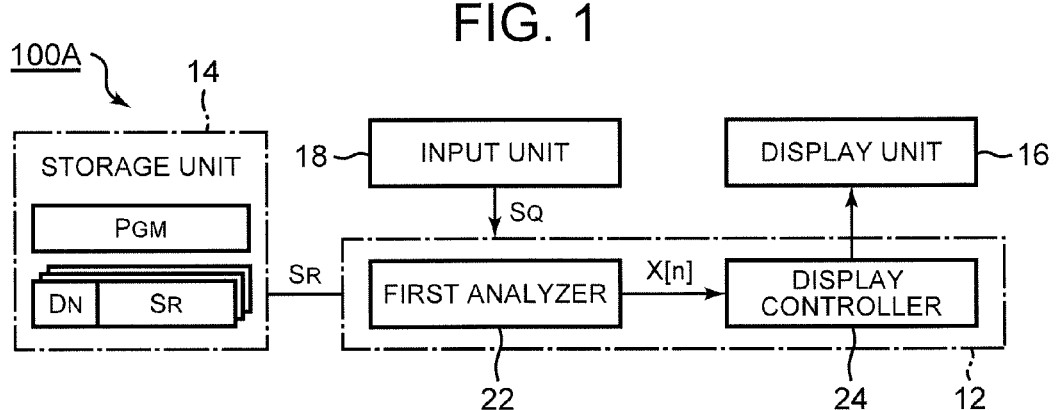
FIG. 1 is a block diagram of a music analysis apparatus according to a first embodiment of the invention.

FIG. 1 is a block diagram of a music analysis apparatus 100A according to a first embodiment of the present invention. The music analysis apparatus 100A according to the first embodiment of the invention is a signal processing apparatus that evaluates a musical correlation between a time series of notes designated by a user (designated sequence of notes) and each of a plurality of previously prepared reference pieces of music and is preferably used as a music search apparatus for searching the plurality of reference pieces of music for a piece of music including a section similar or corresponding to the designated sequence of notes. As shown in FIG. 1, the music analysis apparatus 100A is implemented as a computer system including an execution processing unit 12, a storage unit 14, a display unit 16, and an input unit 18.

The storage unit 14 stores a program PGM executed by the execution processing unit 12 and information used by the execution processing unit 12. A known storage medium such as a semiconductor storage medium, a magnetic storage medium or the like, or a combination of storage media of a plurality of types can be used as the storage unit 14.

The storage unit 14 according to the first embodiment stores attribute information $D_N$ and reference sequences of notes $S_R$ respectively corresponding to N reference pieces of music. The attribute information $D_N$ designates an identification code (for example, a music title) of a reference piece of music, a tempo of the reference piece of music, etc. Each reference sequence of notes $S_R$ designates a time series of notes constituting at least part of the corresponding reference piece of music. For example, time-series data in a MIDI format, in which event data that designates the pitch of each note of a reference piece of music and instructs sound generation/sound suppression and timing data that designates an event data processing time are arranged in a time series, is preferably employed as the reference sequence of notes $S_R$.

The display unit 16 (for example, a liquid crystal display) displays an analysis result obtained by the execution processing unit 12. The input unit 18 receives an instruction from a user. Specifically, the user designates a plurality of notes constituting a designated sequence of notes $S_Q$ through the input unit 18. For example, an electronic instrument such as a MIDI instrument is preferably used as the input unit 18. Accordingly, the designated sequence of notes $S_Q$ is described as time-series data in a MIDI format, like the reference sequence of notes $S_R$. A subscript R (reference) may be attached to a reference symbol of a component relating to the reference sequence of notes $S_R$ and a subscript Q (query) may be attached to a reference symbol of a component relating to the designated sequence of notes $S_Q$, like representation of the reference sequence of notes $S_R$ and the designated sequence of notes $S_Q$.

The reference sequence of notes $S_R$ and the designated sequence of notes $S_Q$ are note rows of polyphonic music generated when a plurality of notes constituting a chord and a plurality of notes corresponding to different play parts are sounded simultaneously. A plurality of notes, simultaneously sounded, is sequentially designated to notes in time-series data in the MIDI format. Accordingly, the order of designating notes constituting a chord designated by the user to the designated sequence of notes $S_Q$ can be varied according to manipulation (a fine difference between timings of designating notes) of the user, which is applied to the input unit 18. For example, although the user intends to designate a chord of "do, mi, so", notes constituting the chord may be arranged in various orders such as "do, so, mi", "mi, do, so", "so, do, mi", etc. in the designated sequence of notes $S_Q$. The reference sequence of notes $S_R$ and the designated sequence of notes $S_Q$ may be note rows of monophonic music.

The execution processing device 12 implements a plurality of functions (functions of a first analyzer 22 and a display controller 24) for analyzing a correlation between the designated sequence of notes $S_Q$ and reference sequence of notes $S_R$ of each of N reference pieces of music, and presenting the analysis result to the user by executing the program $P_{GM}$ stored in the storage unit 14. It is possible to employ a configuration in which the functions of the execution processing unit 12 are distributed across a plurality of integrated circuits or a configuration in which a dedicated electronic circuit (digital signal processor (DSP)) implements some functions.

The first analyzer 22 calculates a similarity index $X[n]$ ($X[1]$ to $X[N]$) (n being in the range of 1 to N) for each of the N reference pieces of music by comparing the designated sequence of notes $S_Q$ with a reference sequence of notes $S_R$ of each reference piece of music. The similarity index $X[n]$ indicates a degree of extent to which the designated sequence of notes $S_Q$ designated by the user and a reference sequence of notes $S_R$ of an n-th reference piece of music are similar to each other (accuracy of extent to which the designated sequence of notes $S_Q$ corresponds to part of a reference piece of music).

Figure 2:
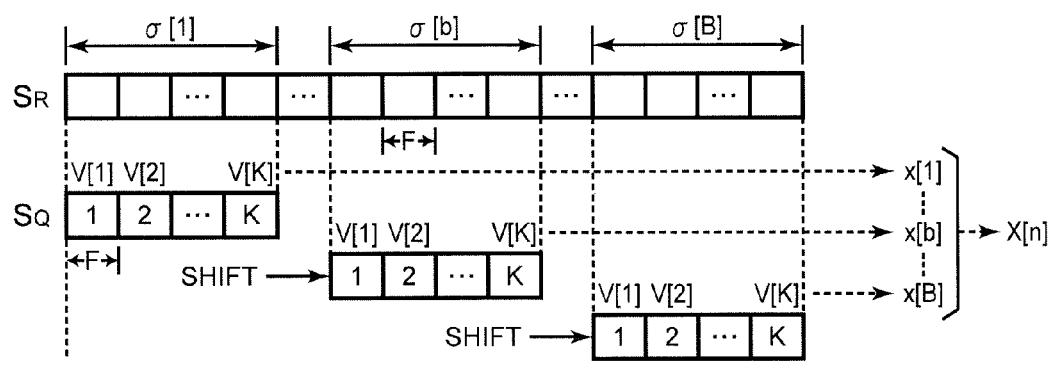
FIG. 2 illustrates operation of a first analyzer.

FIG. 2 illustrates operation of the first analyzer 22. As shown in FIG. 2, the designated sequence of notes $S_Q$ and the reference sequence of notes $S_R$ are divided into a plurality of unit intervals F in the time domain. The unit interval F is set to a duration corresponding to one measure of a piece of music, for example. Specifically, one measure based on a tempo designated by the attribute information $D_N$ of a reference piece of music is determined as one unit interval F of the reference sequence of notes $S_R$, and one measure based on a tempo designated by manipulation of the user, applied to the input unit 18, is determined as one unit interval F of the designated sequence of notes $S_Q$. When the tempo is not designated, an interval corresponding to one measure based on a predetermined tempo and a predetermined beat is set as the unit interval F. For example, if a tempo is 120 BPM (beats per minute) and a time signature is four-four time, the unit interval F is set to 2 seconds. The following description is based on the assumption that the designated sequence of notes $S_Q$ includes K (K being a natural number equal to or greater than 2) unit intervals F and the reference sequence of notes $S_R$ includes a number of unit intervals F, which exceeds K. When the designated sequence of notes $S_Q$ is longer than the reference sequence of notes $S_R$, the length of the designated sequence of notes $S_Q$ may be adjusted to a length (the number of unit intervals F) corresponding to the length of the reference sequence of notes $S_R$ by eliminating an interval corresponding to the end of the designated sequence of notes $S_Q$, and then the following process may be performed.

As shown in FIG. 2, the first analyzer 22 calculates a basic value $x[b]$ ($x[1]$ to $x[N]$) (b being in the range of 1 to B) for each of a plurality of (B) cases in which the temporal position of the designated sequence of notes $S_Q$ with respect to the reference sequence of notes $S_R$ is changed. In the first embodiment, the first analyzer 22 calculates the basic value $x[b]$ for each case in which the designated sequence of notes $S_Q$ is moved (shifted) by the unit interval F with respect to the reference sequence of notes $S_R$. That is, the first analyzer 22 calculates the basic value x[n] by sequentially selecting a target interval σ[b] (a set of K unit intervals F composing a sub reference sequence notes) corresponding to the designated sequence of notes $S_Q$, from among the reference sequence of notes $S_R$, for each case in which the position of the designated sequence of notes $S_Q$ is changed and comparing the designated sequence of notes $S_Q$ with the target interval σ[b] (sub reference sequence of notes). The first analyzer 22 calculates the similarity index X[n] based on B basic values x[1] to x[N] corresponding to different target intervals σ [b] in the reference sequence of notes $S_R$. Specifically, a maximum value (i.e. a value indicating a maximum similarity between the reference sequence of notes $S_R$ and the designated sequence of notes $S_Q$) from among the B basic values x[1] to x[B] is selected as the similarity index X[n].

The first analyzer 22 according to the first embodiment of the invention calculates a similarity V[k] (V[1] to V[K]) (k being in the range of 1 to K) for each pair of unit intervals F corresponding to each other between the designated sequence of notes $S_Q$ and the target interval σ[b] of the reference sequence of notes $S_R$. Specifically, considering the designated sequence of notes $S_Q$ and the reference sequence of notes $S_R$ as time series (character strings) of characters corresponding to notes, the first analyzer 22 calculates the similarity V[k] based on an edit distance (Levenshtein distance) between a k-th unit interval F in the designated sequence of notes $S_Q$ and a k-th unit interval F in the target interval σ[b]. The first analyzer 22 calculates the basic value x[b] from K similarities V[1] to V[K] computed for different unit intervals F of one target interval σ[b] in the reference sequence of notes $S_R$. For example, the average or maximum value of the K similarities V[1] to V[K] is calculated as the basic value x[b].

The edit distance between the designated sequence of notes $S_Q$ and the reference sequence of notes $S_R$ indicates a minimum number of manipulations necessary to modify one of the designated sequence of notes $S_Q$ and the reference sequence of notes $S_R$ into the other through elimination, insertion or substitution of a note corresponding to one character. The edit distance E between the designated sequence of notes $S_Q$ and the reference sequence of notes $S_R$ will now be described on the assumption that the k-th unit interval F of the designated sequence of notes $S_Q$ is composed of M1 notes and the corresponding k-th unit interval F of the target interval σ[b] of the reference sequence of notes $S_R$ is composed of M2 notes. For example, a method using dynamic programming, described below, is preferably used to calculate the edit distance E. Computation of the edit distance E according to the first embodiment of the invention will be described after a case (referred to as "comparative example" hereinafter) in which a general method of calculating an edit distance between character strings is applied to calculation of an edit distance between note rows is described.

Figure 3:
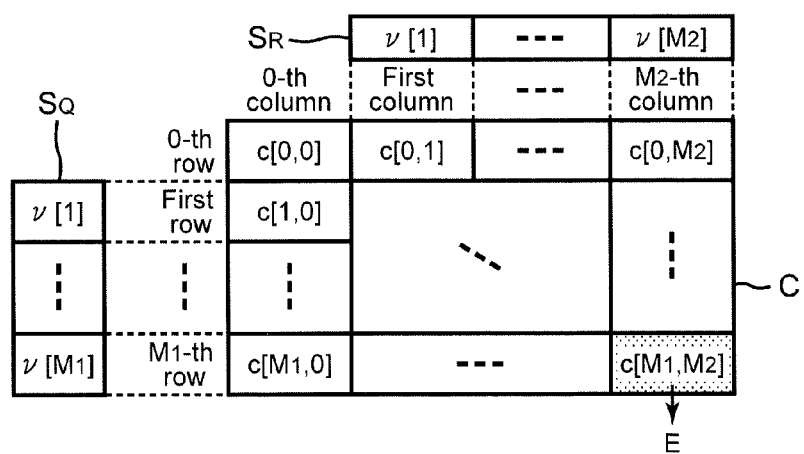
FIG. 3 illustrates a distance matrix.

A distance matrix (cost matrix) C shown in FIG. 3 is considered. The distance matrix C is a (M1+1)-row×(M2+1)-column matrix having distances c [m1, m2] as elements (m1 being in the range of 0 to M1, m2 being in the range of 0 to M2). As shown in FIG. 3, a row m1 of the distance matrix C corresponds to a note v[m1] in the k-th unit interval F of the designated sequence of notes $S_Q$, and a column m2 of the distance matrix C corresponds to a note v[m2] in the k-th unit interval F of the target interval σ[b] of the reference sequence of notes $S_R$. The first analyzer 22 sets a distance c[0, 0] of the 0-th row and 0-th column to 0 and calculates each distance c[m1, m2] of the distance matrix C according to Equation (1).

$$c[m1,m2]=\min\{c[m1,m2-1]+1, c[m1-1,m2]+1, c[m1-1,m2-1]+\gamma\} \quad (1)$$

In Equation (1), min{ } denotes an operation of selecting a minimum value among a plurality values in braces. As indicated by an arrow A1 in FIG. 4, {c[m1, m2−1]+1} of Equation (1) represents increase of a sequence (insertion cost) of inserting the note v[m2] in the reference sequence of notes $S_R$ into the designated sequence of notes $S_Q$. As indicated by an arrow A2 in FIG. 4, {c[m1−1, m2]+1} of Equation (1) represents increase of a sequence (elimination cost) of eliminating the note v[m1] in the designated sequence of notes $S_Q$.

As indicated by an arrow A3 in FIG. 4, {c[m1−1, m2−1]+γ} of Equation (1) represents increase of a sequence of substituting the note v[m2] in the reference sequence of notes $S_R$ for the note v[m1] in the designated sequence of notes $S_Q$. That is, symbol γ in Equation (1) corresponds to an increment (referred to as "substitution cost" hereinafter) of the sequence of substituting the note v[m2] in the reference sequence of notes $S_R$ for the note γ[m1] in the designated sequence of notes $S_Q$. In this comparative example, the substitution cost γ is set to 0 when the note v[m1] in the designated sequence of notes $S_Q$ corresponds to or coincide with the note v[m2] in the reference sequence of notes $S_R$ and set to 1 when the note v[m1] in the designated sequence of notes $S_Q$ does not correspond to or coincide with the note v[m2] in the reference sequence of notes $S_R$.

FIG. 5 shows a distance matrix C between the designated sequence of notes $S_Q$ ($S_Q$={C, E, G, D, F, C, E}, M1=7) and the reference sequence of notes $S_R$ ($S_R$={C, G, F, E, D, C, D, C}, M2=8). Each distance c[m1, m2] of the distance matrix C is calculated through the above-described process and a distance c[M1, M2] between row M1 and column M2 is selected as the edit distance E. The edit distance E is 6 in the example shown in FIG. 5.

As described above, the order of notes constituting the designated sequence of notes $S_Q$ may be changed due to a fine difference between timings of designating the notes and user error. To evaluate a correlation between a piece of music intended by the user and each reference piece of music with high accuracy by compensating for variation in the order of notes, which can be generated in the designated sequence of notes $S_Q$ as described above, the first embodiment of the invention permits the order of consecutive notes in the designated sequence of notes $S_Q$ to be changed to calculate the edit distance E.

The first analyzer 22 according to the first embodiment calculates each distance c[m1, m2] of the distance matrix C through an operation according to Equation (1). While the insertion cost and the elimination cost used to calculate the distance c[m1, m2] are identical to those of the above-described comparative example, a method of calculating the substitution cost γ is different from that of the comparative example. FIG. 6 illustrates the substitution cost γ applied by the first analyzer 22 according to the first embodiment to calculation (Equation (1)) of the distance c[m1, m2] of the distance matrix C.

As shown in FIG. 6, the first analyzer 22 sets a tolerance interval (margin) α[m1] including the note v[m1] of the designated sequence of notes $S_Q$ within the designated sequence of notes $S_Q$. FIG. 6 illustrates a case in which a tolerance interval α[m1] corresponding to three notes including the note v[m1], immediately previous note v[m1−1], and the next note v[m1+1] is set. The first analyzer 22 sets the substitution cost γ, which is applied to calculation of the distance c[m1, m2] corresponding to the note v[m1] in the designated sequence of notes $S_Q$ and the note v[m2] in the reference sequence of notes $S_R$, to 0 (first value) when any of the three notes (v[m1−1], v[m1] and v[m1+1]) in the tolerance interval α[m1] of the designated sequence of notes $S_Q$ corresponds to the note v[m2] in the reference sequence of notes $S_R$, and sets the substitution cost γ to 1 (second value) when the note v[m2] in the reference sequence of notes $S_R$ does not correspond to any of the notes in the tolerance interval α[m1]. Accordingly, the distance c[m1, m2] (sequence) does not increase when arrangement of the notes in the designated sequence of notes $S_Q$ corresponds to arrangement in which consecutive notes in the reference sequence of notes $S_R$ have been changed within a tolerance interval or margin.

FIG. 7 shows a distance matrix C with respect to the designated sequence of notes $S_Q$ and the reference sequence of notes $S_R$, which is calculated by the first analyzer 22 according to the first embodiment. Since notes consecutive in the designated sequence of notes $S_Q$ are permitted to be changed in the first embodiment, the edit distance (E=2) calculated in the first embodiment is smaller than the edit distance (E=6) of the comparative example.

The first analyzer 22 calculates each distance c[m1, m2] of the distance matrix C through the above-described operation and selects the distance c[M1, M2] of the row M1 and column M2 as the edit distance E between the k-th unit interval F of the designated sequence of notes $S_Q$ and the k-th unit interval F within the target interval σ[b] of the reference sequence of notes $S_R$. As can be understood from the above description, the edit distance E decreases as a similarity between arrangement of notes in the designated sequence of notes $S_Q$ and arrangement of notes in the reference sequence of notes $S_R$ increases.

The first analyzer 22 calculates the similarity V[k] based on the edit distance E computed for the k-th unit interval F between the designated sequence of notes $S_Q$ and the reference sequence of notes $S_R$. Specifically, the first analyzer 22 calculates the similarity V[k] through an operation according to equation (2).

$$V[k] = 1 - \frac{E}{E\max} \quad (2)$$

In Equation (2), Emax denotes a larger one of the number M1 of notes in the k-th unit interval F of the designated sequence of notes $S_Q$ and the number M2 of notes in the k-th unit interval F within the target interval σ[b] of the reference sequence of notes $S_R$. Stated otherwise, Emax is the highest sequence required for modifying one of the designated sequence of notes and the reference sequence of notes into the other. As can be known from Equation (2), the similarity V[k] increases as the edit distance E decreases (arrangement of notes in the designated sequence of notes $S_Q$ and arrangement of notes in the reference sequence of notes $S_R$ become similar to each other). As described above with reference to FIG. 2, the first analyzer 22 calculates the basic value x[b] from the K similarities V[1] to V[K] corresponding to each unit interval F of the target interval σ[b] and selects, as the similarity index X[n], a maximum value from among B number of basic values x[1] to x[B] corresponding to different target intervals σ[b] in the reference sequence of notes of an n-th reference piece of music. As is understood from the above description, the similarity index X[n] of a reference piece of music including an interval having note arrangement similar to arrangement of notes in the designated sequence of notes becomes a large value.

Figure 16:
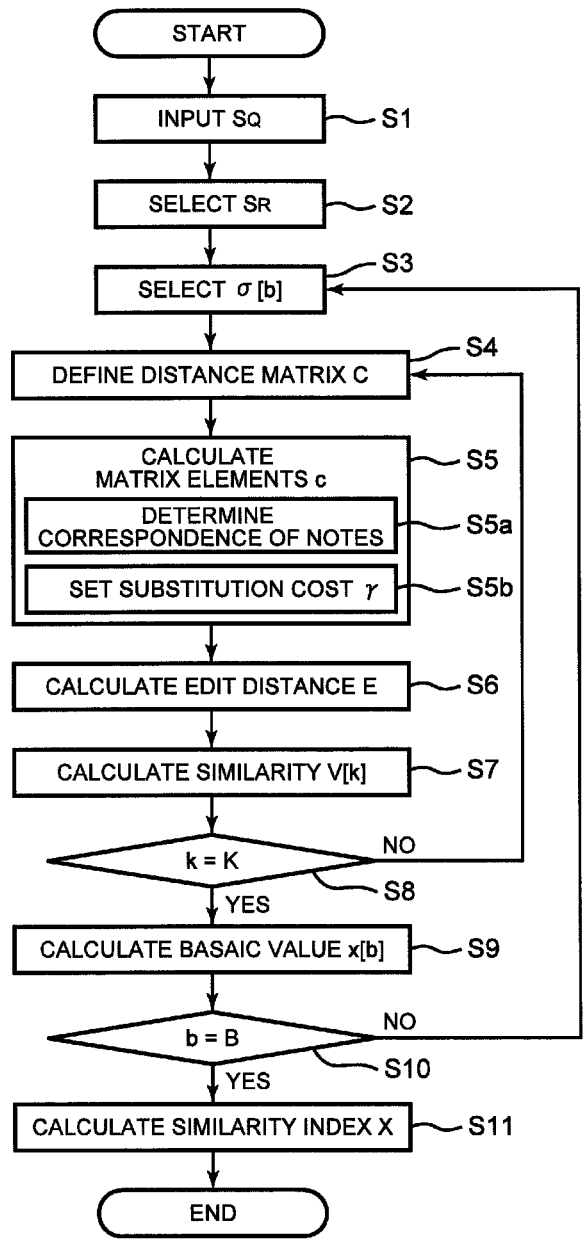
FIG. 16 is a flowchart showing a music analysis method performed by the music analysis apparatus according to the present invention.

FIG. 16 is a flowchart showing a music analysis method performed by the music analysis apparatus 100A. At Step S1, a designated sequence of notes $S_Q$ is inputted. As shown in FIG. 2, the designated sequence of notes $S_Q$ is composed of K number of unit intervals F. Each unit interval F corresponds to one measure for example.

At Step S2, a reference sequence of notes $S_R$ is selected. As shown in FIG. 2, the selected reference sequence of notes $S_R$ is longer than the target sequence of notes $S_Q$ and composed of B+K−1 number of unit intervals F.

At Step S3, a target interval σ[b] is selected from the reference sequence of notes $S_R$ for comparison with the designated sequence of notes $S_Q$. The target interval σ[b] is a subsequence of reference sequence of notes $S_R$. In detail, as shown in FIG. 2, a target interval σ[b] (a set of K unit intervals F) is selected in correspondence to the designated sequence of notes $S_Q$, from the reference sequence of notes $S_R$, for each case in which the position of the designated sequence of notes $S_Q$ is shifted for comparing the designated sequence of notes $S_Q$ with the target interval σ[b]. The target interval σ[b] is selected sequentially from b=1 to b=B.

At step S4, a pair of unit intervals F are taken from the designated sequence of notes $S_Q$ and the corresponding target interval σ[b] to define a distance matrix C shown in FIG. 5. In case that the unit interval F from the designated sequence of notes $S_Q$ contains M1 number of notes and the unit interval F from the target interval σ[b] contains M2 number of notes for example, the distance matrix is composed of M1+1 rows and M2+1 columns. The pair of the corresponding unit intervals F are taken sequentially from k=1 to k=K.

At step S5, each element (distance) c of the distance matrix C is sequentially calculated according to Equation (1). This computation includes a note correspondence determination process of Step S5a and a substitution cost 7 setting process of Step S5b. As shown in FIG. 4, the note correspondence determination process determines whether or not one of a first note v[m1] in the designated sequence of notes $S_Q$ designated by a user and a second note v[m2] in a subsequence (namely, target interval σ[b]) from the reference sequence of notes $S_R$ corresponds to any of a plurality of notes contained in a tolerance interval containing the other of the first note and the second note. The substitution cost γ setting process sets a substitution cost γ between the first note and the second note when one of the first note and the second note corresponds to any of the plurality of notes contained in the tolerance interval, and sets the substitution cost γ to a second value different from the first value when one of the first note and the second note does not correspond to any of the plurality of notes contained in the tolerance interval. Each element c (distance) of the distance matrix C is computed through the routine of the note correspondence determination process and the substitution cost γ setting process.

At Step S6, the edit distance E is calculated from the distance matrix C. Specifically, Step S6 calculates each distance c[m1, m2] of the distance matrix C through the above-described operation and selects the distance c[M1, M2] of the row M1 and column M2 as the edit distance E between the k-th unit interval F of the designated sequence of notes $S_Q$ and the k-th unit interval F within the target interval σ[b] of the reference sequence of notes $S_R$. As can be understood from the above description, the edit distance E decreases as a similarity between arrangement of notes in the designated sequence of notes $S_Q$ and arrangement of notes in the reference sequence of notes $S_R$ increases.

At Step S7, the similarity V[k] is calculated based on the edit distance E computed for the k-th unit interval F between the designated sequence of notes $S_Q$ and the reference sequence of notes $S_R$. Specifically, the similarity V[k] is calculated through operation according to Equation (2).

At Step S8, it is judged whether or not k reaches K. If NO, the process returns to Step S4, and the routine from Step S4 through Step S7 is executed for a next pair of unit intervals to calculate a next similarity V[k+1]. By such a manner, if k reaches K, the judgment of Step S8 turns to YES, then the process advances to Step S9.

At Step S9, the basic value x[b] is calculated from K similarities V[1] to V[K] computed for different unit intervals F of one target interval σ[b] taken from the reference sequence of notes $S_R$. For example, the average or maximum value of the K similarities V[1] to V[K] is calculated as the basic value x[b].

At Step S10, it is judged whether or not b reaches B. If NO, the process returns to Step S3, and the routine from Step S3 through Step S9 is executed for a next target interval σ[b+1] to calculate a next basic value similarity x[b+1]. By such a manner, if b reaches B, the judgment of Step S10 turns to YES, then the process advances to Step S11.

At Step S11, the similarity index X[n] is calculated based on B number of basic values x[1] to x[B] corresponding to different target intervals σ[b] in the reference sequence of notes $S_R$. Specifically, a maximum value (i.e. a value indicating a maximum similarity between the reference sequence of notes $S_R$ and the designated sequence of notes $S_Q$) from among the B basic values x[1] to x[B] is selected as the similarity index X[n].

The display controller 24 shown in FIG. 1 controls the display unit 16 to display an analysis result obtained by the first analyzer 22. Specifically, the display controller 24 controls the display unit 16 to display a list in which identification codes (music titles) of reference pieces of music represented by the attribute information $D_N$ are arranged in the order of the similarity indices X[n] (in descending order of similarities between the designated sequence of notes $S_Q$ and the reference sequence of notes $S_R$), as shown in FIG. 8. The user can select the music title of a reference piece of music having high possibility of including the designated sequence of notes $S_Q$ designated by the user with reference to the display list shown in FIG. 8.

Since the edit distance E between the designated sequence of notes $S_Q$ and the reference sequence of notes $S_R$ is calculated by permitting notes consecutive in the designated sequence of notes $S_Q$ to be changed in the above-described first embodiment, it is possible to analyze the correlation between the designated sequence of notes $S_Q$ and the reference sequence of notes $S_R$ robustly against variation in the order of notes of the designated sequence of notes. That is, even when the order of notes of the designated sequence of notes $S_Q$ is different from the order of notes intended by the user (i.e. the order of notes in a reference sequence of notes that the user wants to search) due to incorrect manipulation of the input unit 18 by the user, it is possible to calculate a high similarity index X[n] for the reference piece of music intended by the user. Provided that the reference sequence of notes $S_R$ includes a chord of "do, mi, so", even if the user designates tones of the chord in the order of "do, so, mi", "mi, do, so" and "so, do, mi", the similarity index X[n] corresponds to a similarity index obtained when "do, mi, so" is designated. Furthermore, it is possible to easily achieve the above effect by determining whether each note in the tolerance interval α[m1] is equal to the note v[m2], instead of determining whether the note v[m1] and the note v[m2] are equal to each other in the comparative example.

In the first embodiment of the invention, the basic value x[n] is calculated based on the edit distance E for each of a plurality of cases in which the position of the designated sequence of notes $S_Q$ is changed with respect to the reference sequence of notes $S_R$, and the similarity index X[n] is set based on the basic values x[1] to x[B]. Accordingly, it is possible to appropriately evaluate the correlation between the designated sequence of notes $S_Q$ and the reference sequence of notes $S_R$ even when the user designates only a specific part of the corresponding reference piece of music as the designated sequence of notes $S_Q$ or query (when the designated sequence of notes $S_Q$ corresponds to only a specific part of the reference sequence of notes $S_R$).

<Second Embodiment>

A second embodiment of the present invention will now be described. In each embodiment illustrated below, components whose operations or functions are similar to those of the first embodiment will be denoted by the same reference numerals as used in the above description and a detailed description thereof will be omitted as appropriate.

FIG. 9 illustrates the substitution cost γ applied by the first analyzer 22 according to the second embodiment to calculation (Equation (1)) of the distance c[m1, m2] of the distance matrix C. The first analyzer 22 of the first embodiment sets the tolerance interval α[m1] within the designated sequence of notes $S_Q$, whereas the first analyzer 22 of the second embodiment sets a tolerance interval α[m2] including the note v[m2] of the reference sequence of notes $S_R$ within the reference sequence of notes $S_R$, as shown in FIG. 9.

FIG. 9 illustrates a case in which the tolerance interval α[m2] corresponding to three notes including the previous note v[m2−1], note v[m2] and the next note v[m2+1] is set.

The first analyzer 22 sets the substitution cost γ, which is applied to calculation of the distance c[m1, m2] corresponding to the note v[m1] in the designated sequence of notes $S_Q$ and the note v[m2] in the reference sequence of notes $S_R$, to 0 (first value) when the note v[m1] in the designated sequence of notes $S_Q$ corresponds to any of the notes (v[m2−1], v[m2] and v[m2+1]) in the tolerance interval α[m2], and sets the substitution cost γ to 1 (second value) when the note v[m1] does not correspond to any of the notes in the tolerance interval α[m2]. Accordingly, the distance c[m1, m2] does not increase when arrangement of the notes in the reference sequence of notes $S_R$ corresponds to arrangement in which notes consecutive in the designated sequence of notes $S_Q$ have been changed. The distance c[M1, M2] of row M1 and column M2 of the distance matrix C calculated through the above sequence is selected as the edit distance E. Calculation of the similarity V[k] based on the edit distance E and calculation of the similarity index X[n] based on the similarity V[k] are identical to those of the first embodiment of the invention.

Figures 10, 11:
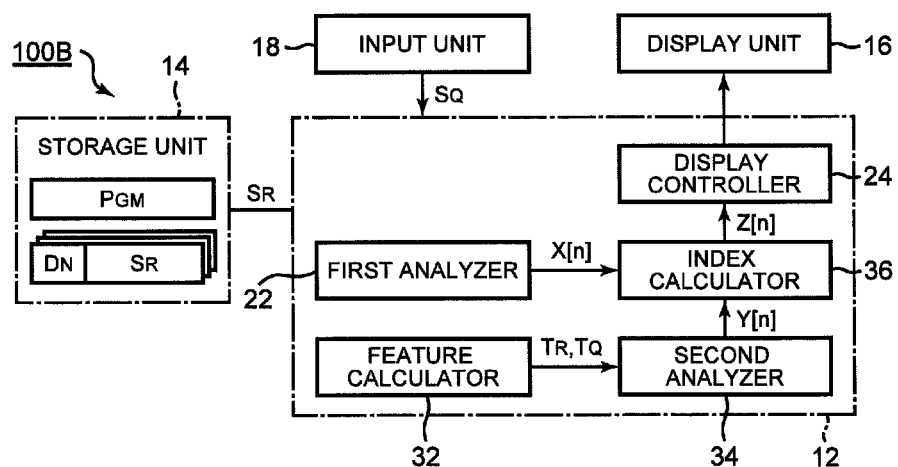
FIG. 10 illustrates an exemplary distance matrix according to the second embodiment of the present invention in detail.
FIG. 11 is a block diagram of a music analysis apparatus according to a fourth embodiment of the present invention.

FIG. 10 shows a distance matrix C with respect to the designated sequence of notes $S_Q$ and the reference sequence of notes $S_R$, which is calculated by the first analyzer 22 according to the second embodiment. As shown in FIG. 10, the edit distance E (E=4) calculated in the second embodiment is smaller than the edit distance E (E=6) computed by the comparative example. The second embodiment can achieve the same effect as that of the first embodiment.

<Third Embodiment>

As can be seen from comparison of FIG. 7 with FIG. 10, the edit distance E (E=2) when the tolerance interval α[m1] is set in the designated sequence of notes $S_Q$ may be different from the edit distance E (E=4) when the tolerance interval α[m2] is set in the reference sequence of notes $S_R$. The first analyzer 22 according to the third embodiment calculates both the edit distance $E_Q$ when the tolerance interval α[m1] is set in the designated sequence of notes $S_Q$ and the edit distance $E_R$ when the tolerance interval α[m2] is set in the reference sequence of notes $S_R$, and computes the edit distance E (furthermore similarity index value X[n]) based on the edit distance $E_Q$ and the edit distance $E_R$. For example, the first analyzer 22 calculates the average (typically, simple average) of the edit distance $E_Q$ and the edit distance $E_R$ as the edit distance E. In the case of FIGS. 7 and 10, for example, the edit distance E is calculated as 3 (=(2+4)/2). Calculation of the similarity V[k] based on the edit distance E and calculation of the similarity index X[n] based on the similarity V[k] are identical to those of the first embodiment of the invention.

The third embodiment can achieve the same effect as that of the first embodiment. Furthermore, since the edit distance E is computed based on the edit distance $E_Q$ and the edit distance $E_R$ in the third embodiment, the influence of the difference between the edit distance E when the tolerance interval α[m1] is set in the designated sequence of notes $S_Q$ and the edit distance E when the tolerance interval α[m2] is set in the reference sequence of notes $S_R$ can be reduced, and thus the correlation between the designated sequence of notes $S_Q$ and the reference sequence of notes $S_R$ can be evaluated with high accuracy.

<Fourth Embodiment>

FIG. 11 is a block diagram of a music analysis apparatus 100B according to the fourth embodiment of the invention. The music analysis apparatus 100B according to the fourth embodiment includes a feature calculator 32, a second analyzer 34 and an index calculator 36 in addition to the components of the music analysis apparatus 100A according to the first embodiment. The operation of the first analyzer 22 to calculate the similarity index X[n] for each reference piece of music is identical to that of the first embodiment.

The feature calculator 32 calculates a duration feature T (a duration feature $T_R$ of the reference sequence of notes $S_R$ and a duration feature $T_Q$ of the designated sequence of notes $S_Q$) representing musical characteristics (particularly, harmonic characteristics) of a note row. The duration feature $T_R$ is calculated for each unit interval F of the reference sequence of notes $S_R$ and the duration feature $T_Q$ is calculated for each unit interval F of the designated sequence of notes $S_Q$. A unit interval F for which the edit distance E is calculated can be different from a unit interval for which the duration feature T is calculated.

Figure 12:
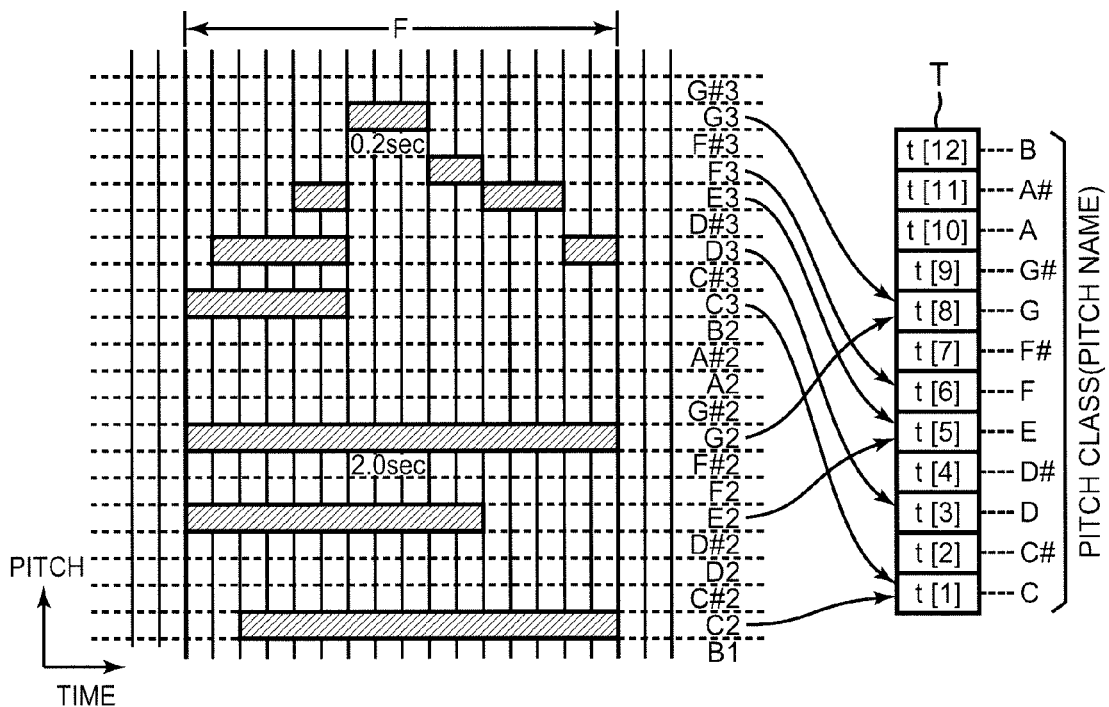
FIG. 12 illustrates a duration feature.

FIG. 12 illustrates a sequence of notes (piano roll) arranged in a coordinate system to which a time axis (horizontal axis) and a pitch axis (vertical axis) are set. As shown in FIG. 12, the duration feature T ($T_R$ and $T_Q$) is a 12-dimensional vector in which 12 element values t[1] to t[12] corresponding to different pitch classes (pitch names) are arranged. A pitch class in the fourth embodiment is a set of pitches (note numbers) having a common pitch name. That is, a plurality of pitches at frequencies of a power of 2 (having the same pitch name in different octaves) belongs to the same pitch class. The element values t[1] to t[12] are calculated for 12 pitch classes corresponding to 12 semitones (C, C#, D, D#, E, F, F#, G, G#, A, A#, B).

An element value t[c] corresponding to a c-th (c being in the range of 1 to 12) pitch class is the ratio (t[c]=τa/τb) of the sum τa of durations (phonetic values) of notes belonging to the corresponding pitch class from among a plurality of notes included in one unit interval F to the sum τb of durations of all notes in the unit interval F. Division according to the sum τb is an operation of normalizing the element value t[c] to a value in the range of 0 to 1. As shown in FIG. 12, when a note (having a duration of 2 seconds) of pitch G2 and a note (having a duration of 0.2 seconds) of pitch G3, which belong to the same pitch class (pitch name G), are included in the unit interval F (τa=2+0.2=2.2) and the sum τb of durations of all notes in the unit interval F is 8 seconds, element value t[8] corresponding to the pitch class (c=8) of pitch name G in the duration feature T is 0.275 (=2.2/8).

The second analyzer 34 shown in FIG. 11 calculates a similarity index Y[n] (Y[1] to Y[N]) for each of N reference pieces of music by comparing the duration feature $T_Q$ of each unit interval F of the designated sequence of notes $S_Q$ with the duration feature $T_R$ of each unit interval F of the reference sequence of notes $S_R$. The similarity index Y[n] indicates a degree of extent to which the reference sequence of notes $S_R$ of the n-th reference piece of music and the designated sequence of notes $S_Q$ are similar to each other from a harmonic perspective. The similarity index X[n] is a measure for evaluating a correlation between note rows by ignoring the duration of each note, whereas the similarity index Y[n] is a measure for evaluating a correlation between note rows from a harmonic perspective by emphasizing notes having a long duration.

Figure 13:
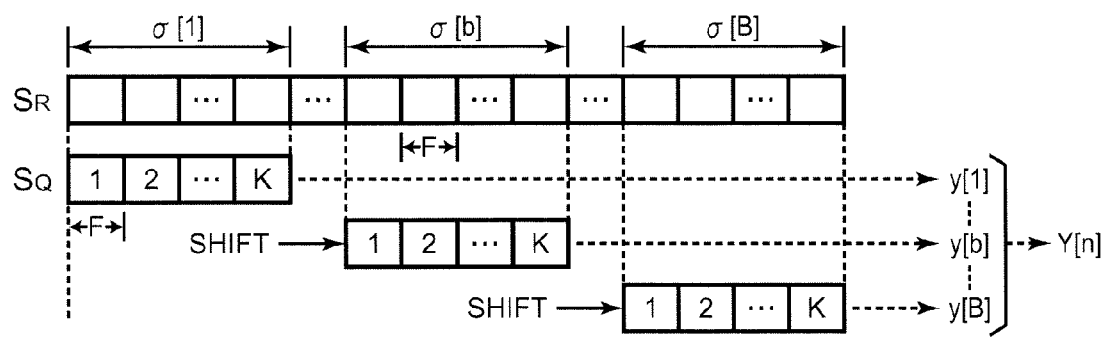
FIG. 13 illustrates operation of a second analyzer.

As shown in FIG. 13, the second analyzer 34 calculates a basic value y[b] (y[1] to y[B]) for each of a plurality of (B) cases in which the temporal position of the designated sequence of notes $S_Q$ with respect to the reference sequence of notes $S_R$ is changed. Specifically, the basic value y[b] is calculated for each case in which the designated sequence of notes $S_Q$ is shifted by one unit interval F with respect to the reference sequence of notes $S_R$. That is, the second analyzer 34 calculates the basic value y[b] by sequentially selecting a target interval σ[b] in the reference sequence of notes $S_R$ and comparing duration features $T_Q$ corresponding to K unit intervals F in the designated sequence of notes $S_Q$ with duration features $T_R$ corresponding to K unit intervals F in the target interval σ[b].

Specifically, the second analyzer 34 calculates, as the basic value y[b], a distance (e.g. cosine distance) between the mean vector of the duration features $T_Q$ corresponding to K unit intervals F in the designated sequence of notes $S_Q$ and the mean vector of the duration features $T_R$ corresponding to K unit intervals F in the target interval σ[b]. Accordingly, the basic value y[b] increases as a similarity between the duration feature $T_Q$ of each unit interval F of the designated sequence of notes $S_Q$ and the duration feature $T_R$ of each unit interval F of the target interval σ[b] increases. The second analyzer 34 calculates the similarity index Y[n] based on B basic values y[1] to y[B] corresponding to target intervals σ[b] sequentially set in the reference sequence of notes $S_R$. For example, a maximum value (i.e. the basic value y[b] of a target interval σ[B] including a duration feature T most similar to each duration feature T of the designated sequence of notes $S_Q$) from among the B basic values y[1] to y[B] is calculated as the similarity index Y[n]. Accordingly, the similarity index Y[n] of a reference piece of music including an interval musically (harmonically) similar to the designated sequence of notes is set to a large value. The average of the B basic values y[1] to y[B] may be calculated as the similarity index Y[n].

The index calculator 36 shown in FIG. 11 calculates a third similarity index Z[n] based on the first similarity index X[n] computed by the first analyzer 22 and the second similarity index Y[n] computed by the second analyzer 34 for each reference piece of music. For example, the index calculator 36 calculates the weighted sum of the similarity index X[n] and the similarity index Y[n] as the similarity index Z[n] of the n-th reference piece of music, as represented by Equation (3).

$$Z[n]=W_X X[n]+W_Y Y[n] \qquad (3)$$

In Equation (3), $W_X$ denotes a weight (i.e. a degree to which a similarity of note arrangement is emphasized) with respect to the similarity index X[n], and $W_Y$ denotes a weight (i.e. a degree to which similarity of harmony sense is emphasized) with respect to the similarity index Y[n]. The weights $W_X$ and $W_Y$ are variably set according to manipulation of the user, applied to the input unit 18. Furthermore, a configuration in which the weights $W_X$ and $W_Y$ are fixed to a predetermined value (e.g. $W_X=W_Y=0.5$) may be employed. As is understood from the above description, the similarity index Z[n] increases as the similarity between the designated sequence of notes $S_Q$ and the reference sequence of notes $S_R$ increases.

The display controller 24 according to the fourth embodiment controls the display unit 16 to display a result of analysis of similarity indices Z[1] to Z[N] by the index calculator 36. Specifically, the display controller 24 controls the display unit 16 to display an image in the form of a list in which identification codes (music titles) of reference pieces of music are arranged in the order of similarity indices Z[n] (descending order of correlation between the designated sequence of notes $S_Q$ and the reference sequence of notes $S_R$). Furthermore, a configuration in which only a reference piece of music (i.e. reference piece of music most similar to the designated sequence of notes $S_Q$) having a maximum similarity index Z[n] is displayed on the display unit 16 can be employed.

The fourth embodiment can achieve the same effect as that of the first embodiment. In the fourth embodiment, the similarity index Z[n] is calculated according to both the similarity index X[n] based on arrangements of notes of the designated sequence of notes $S_Q$ and the reference sequence of notes $S_R$ and the similarity index Y[n] based on harmony senses of the designated sequence of notes $S_Q$ and the reference sequence of notes $S_R$. Accordingly, the correlation between the designated sequence of notes $S_Q$ and the reference sequence of notes $S_R$ can be analyzed with high accuracy, compared to a configuration in which only an edit distance between note rows is used (e.g. non-patent reference 1). The configuration (feature calculator 32, second analyzer 34 and index calculator 36) of the fourth embodiment can be equally applied to the second and third embodiments.

Figures 14, 15:
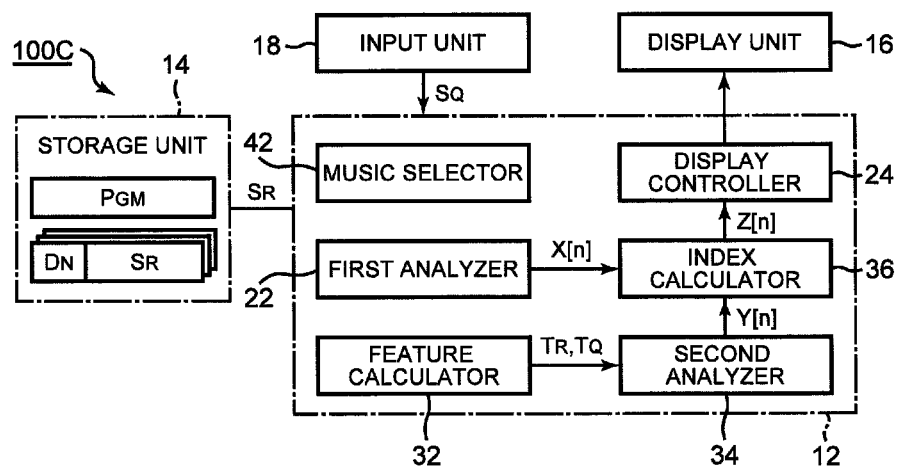
FIG. 14 illustrates effects of the embodiments.
FIG. 15 is a block diagram of a music analysis apparatus according to a fifth embodiment of the present invention.

FIG. 14 shows analysis results according to the above-described embodiments. Specifically, FIG. 14 shows results obtained by preparing a plurality of (150) note rows generated when a user plays a specific reference piece of music (referred to as "target piece of music" hereinafter) on a keyboard instrument as designated sequences of notes $S_Q$ and evaluating a correlation between each designated sequence of notes $S_Q$ and each of N (N=5000) reference pieces of music including the target piece of music. Each designated sequence of notes $S_Q$ includes a play error and does not perfectly correspond to a reference sequence of notes $S_R$ of the target piece of music in some cases.

In configuration 1 of FIG. 14, only the similarity index Y[n] was calculated and the similarity index X[n] was not calculated. In configurations 2 and 3, only the similarity index X[n] was calculated and the similarity index Y[n] was not calculated. In configurations 4 and 5, the similarity index Z[n] was calculated (both the similarity index X[n] and the similarity index Y[n] were calculated). The similarity index X[n] was calculated (margin: 0) without setting a tolerance interval ($\alpha[m1]$, $\alpha[m2]$) in configurations 2 and 4, whereas the similarity index X[n] was calculated (margin: 3) after a tolerance interval ($\alpha[m1]$, $\alpha[m2]$) was set to each of the designated sequence of notes $S_Q$ and reference sequence of notes $S_R$ in configurations 3 and 5. In addition, in configurations 3 and 5, a tolerance interval corresponding to three notes before a note and three notes following the note was set. The comparative example illustrated in the first embodiment corresponds to configuration 2. The third embodiment corresponds to configuration 3 and the fourth embodiment corresponds to configuration 5. A configuration (configuration including calculation of the similarity index Y[n] in addition to the comparative example) in which a tolerance interval is not set in the fourth embodiment corresponds to configuration 4.

FIG. 14 shows an average rank, top-1 rate, top-3 rate and top-5 rate for each of configurations 1 to 5. The average rank refers to the average of ranks of similarity indices of the target piece of music, from among a plurality of similarity indices calculated between each designated sequence of notes $S_Q$ and each reference sequence of notes $S_R$. Accordingly, analysis can be evaluated as highly accurate when the average rank is close to 1 (low). The top-1 rate refers to the percentage (%) of similarity indices of the designated sequence of notes $S_Q$ and the reference sequence of notes $S_R$ of the target piece of music, which correspond to the top rank (first rank) in N reference pieces of music. Similarly, the top-3 rate refers to the percentage (%) of similarity indices of the target piece of music, which correspond to top three ranks in the N reference pieces of music, and the top-5 rate refers to the percentage (%) of similarity indices of the target piece of music, which correspond to top five ranks in the N reference pieces of music. Accordingly, analysis can be evaluated as highly accurate when the top-1 rate, top-3 rate and top-5 rate are high.

As is understood from comparisons of configurations 2 to 5 with configuration 1, it is possible to evaluate the correlation between the designated sequence of notes $S_Q$ and reference sequence of notes $S_R$ with high accuracy by calculating the similarity index X[n] based on the edit distance E as in the first to fourth embodiments, compared to configuration 1. In addition, as is understood from comparison of configuration 2 with configuration 4 and comparison of configuration 3 with configuration 5, analysis accuracy is improved using the similarity index Y[n] in addition to the similarity index X[n] as in the fourth embodiment, compared to the first, second and third embodiments which calculate only the similarity index X[n]. Furthermore, as is understood from comparison of configuration 2 with configuration 3 and comparison of configuration 4 with configuration 5, analysis accuracy is improved by setting a tolerance interval ($\alpha[m1]$, $\alpha[m2]$), compared to a configuration (comparative example) in which the tolerance interval is not set.

<Fifth Embodiment>

FIG. 15 is a block diagram of a music analysis apparatus 100C according to the fifth embodiment of the invention. The music analysis apparatus 100C according to the fifth embodiment includes a music selector 42 in addition to the components of the music analysis apparatus 100B according to the fourth embodiment. The storage unit 14 of the fifth embodiment stores attribute information $D_N$ and a reference sequence of notes $S_R$ corresponding to each of NO pieces of music (referred to as "candidate pieces of music" hereinafter). The music selector 42 selects N reference pieces of music from the N0 candidate pieces of music (N<N0). Specifically, the music selector 42 selects N reference pieces of music estimated to have a high correlation (similarity) with the designated sequence of notes $S_Q$ from the N0 candidate pieces of music. The first analyzer 22 calculates the similarity index X[n] for each of the selected N reference pieces of music, and the feature calculator 32 and the second analyzer 34 calculate the similarity index Y[n] for each of the N reference pieces of music selected by the music selector 42. Operations of the index calculator 36 and the display controller 24 are identical to those of the fourth embodiment of the invention.

While an arbitrary method of selecting reference pieces of music can be employed in the music selector 42, it is preferable to use a method of calculating an index $\lambda$ indicating a degree of correlation with the designated sequence of notes $S_Q$, for example, for each reference piece of music and selecting N reference pieces of music corresponding to high ranks of indices λ as reference pieces of music. A process for calculating the index λ of one candidate piece of music has smaller computational load than the process for calculating the similarity index Z[n] (similarity index X[n] in the first, second and third embodiments) of one reference piece of music.

For example, the music selector 42 calculates, as the index λ for each candidate piece of music, a probability (posterior probability) that a time series of features of the designated sequence of notes $S_Q$ is a note row in each reference sequence of notes $S_R$ using a probability model previously generated through machine learning using conditional random fields (CCF). The probability model is previously generated through machine learning using a time series of duration features $T_R$ extracted from each candidate piece of music as learning information, for example, and the index λ is calculated by applying the probability model to a time series of duration features $T_Q$ extracted from the designated sequence of notes $S_Q$. The music selector 42 selects N candidate pieces of music corresponding to high-rank indices A from the N0 candidate pieces of music as reference pieces of music. The index λ calculated for each reference piece of music can be applied to the similarity index Z[n] (similarity index X[n] in the first, second and third embodiments) of the corresponding reference piece of music. For example, the index calculator 36 adjusts the similarity index Z[n] such that the similarity index Z[n] increases as the indicator λ increases.

The fifth embodiment can achieve the same effect as that of the fourth embodiment. Since the similarity index Z[n] is calculated for N reference pieces of music previously selected from the N0 candidate pieces of music in the fifth embodiment, processing load and processing time are reduced compared to a configuration in which the similarity index Z[n] is calculated for all the N0 candidate pieces of music. The configuration of the fifth embodiment to previously select N reference pieces of music from the N0 candidate pieces of music can be equally applied to the first, second and third embodiments.

<Modifications>

Various modifications can be made to each of the above embodiments. The following are specific examples of such modifications. Two or more modifications arbitrarily selected from the following examples may be appropriately combined.

(1) While the edit distance E between the designated sequence of notes $S_Q$ and the reference sequence of notes $S_R$ is calculated for each unit interval F in the above-described embodiments, the configuration for dividing the designated sequence of notes $S_Q$ and the reference sequence of notes $S_R$ into unit intervals F may be omitted. For example, it is possible to calculate the edit distance E between the whole designated sequence of notes $S_Q$ and the whole reference sequence of notes $S_R$. In addition, while the basic value x[b] is calculated for a plurality of cases in which the position of the designated sequence of notes $S_Q$ with respect to the reference sequence of notes $S_R$ is changed in the above-described embodiments, the configuration for changing the position of the designated sequence of notes $S_Q$ with respect to the reference sequence of notes $S_R$ may be omitted. For example, it is possible to calculate the edit distance E (similarity index X[n]) by determining the position of the designated sequence of notes $S_Q$ with respect to the reference sequence of notes $S_R$ such that the head of the designated sequence of notes $S_Q$ and head of reference sequence of notes $S_R$ correspond to each other on the assumption that the head of a piece of music is designated as the designated sequence of notes $S_Q$ by a user.

(2) While a maximum value of basic values x[1] to x[B] is selected as the similarity index X[n] in the above-described embodiments, the method of calculating the similarity index X[n] may be appropriately modified. For example, the average of the basic values x[1] to x[B] can be calculated as the similarity index X[n]. Furthermore, while the configuration in which the similarity index X[n] increases as similarity between the designated sequence of notes $S_Q$ and reference sequence of notes $S_R$ increases (edit distance E decreases) is illustrated in the above-described embodiments, the relationship between similarity between the designated sequence of notes $S_Q$ and reference sequence of notes $S_R$ and the similarity index X[n] is not limited thereto. For example, in a configuration in which the edit distance E is calculated as the similarity V[k] (or basic value x[b]) (V[k]=E), the similarity index X[n] decreases as similarity between the designated sequence of notes $S_Q$ and reference sequence of notes $S_R$ increases (edit distance E decreases). The relationship between the similarity between the designated sequence of notes $S_Q$ and reference sequence of notes $S_R$ and the similarity index Y[n] and similarity index Z[n] is also not limited to the disclosed embodiments.

(3) While the tolerance interval α[m1] corresponding to one note v[m1] and the same number of notes before and after the note v[m1] is illustrated in the above-described embodiments, the method of setting the tolerance interval α[m1] may be appropriately modified. For example, it is possible to employ a configuration in which a time series of a predetermined number of notes having the note v[m1] disposed at the end is set to the tolerance interval α[m1] and a configuration in which a time series of a predetermined number of notes having the note v[m1] disposed at the head is set to the tolerance interval α[m1]. In addition, the number of notes disposed before the note v[m1] and the number of notes following the note v[m1] in the tolerance interval α[m1] may be different from each other. Furthermore, while the tolerance interval α[m1] set to the designated sequence of notes $S_Q$ is illustrated in the above description, the same modification may be applied to the tolerance interval α[m2] set to the reference sequence of notes $S_R$.

(4) While the average of the edit distance $E_Q$ when the tolerance interval α[m1] is set to the designated sequence of notes $S_Q$ and the edit distance $E_R$ when the tolerance interval α[m2] is set to the reference sequence of notes $S_R$ is calculated as the edit distance E in the third embodiment, the method of calculating the edit distance E (similarity index X[b]) based on the edit distance $E_Q$ and the edit distance $E_R$ may be appropriately modified. For example, it is possible to employ a configuration in which the similarity index X[n] is calculated using the maximum value or minimum value of the edit distance $E_Q$ and the edit distance $E_R$ as the edit distance E and a configuration in which the edit distance E is calculated through a predetermined operation (e.g. multiplication of the edit distance $E_Q$ by the edit distance $E_R$) performed on the edit distance $E_Q$ and the edit distance $E_R$. In addition, only one of the edit distance $E_Q$ and the edit distance $E_R$ may be used.

(5) While the substitution cost γ is set to 0 or 1 in the above-described embodiments, the substitution cost γ may be appropriately changed. For example, the substitution cost γ can be set to 0 or 2 (or value greater than 2). Furthermore, it is possible to calculate the edit distance E (weighted edit distance) with an insertion cost and elimination cost set to numerical values other than 1.

(6) The method of calculating the similarity index Z[n] based on the similarity index X[n] and the similarity index Y[n] is modifiable in the fourth embodiment. For example, it is possible to employ a configuration in which a product of the similarity index X[n] and the similarity index Y[n] is calculated as the similarity index Z[n] and a configuration in which the similarity index Z[n] is calculated by executing a predetermined operation on the similarity index X[n] and the similarity index Y[n]. In addition, while the feature calculator 32 calculates the duration feature $T_R$ of the reference sequence of notes $S_R$ in the fourth embodiment, a configuration in which the duration feature $T_R$ of the reference sequence of notes $S_R$ is previously stored in the storage unit 14 may be employed. That is, the configuration in which the feature calculator 32 calculates the duration feature $T_R$ of the reference sequence of notes $S_R$ may be omitted.

(7) The method of selecting N reference pieces of music by the music selector 42 of the fifth embodiment is not limitative. For example, N0 candidate pieces of music can be previously classified into a plurality of subsets (clusters) based on features (e.g. a time series of duration features $T_R$) extracted from each candidate piece of music, and candidate pieces of music in a subset corresponding to a feature extracted from the designated sequence of notes $S_Q$ can be selected by the music selector 42 as reference pieces of music. A known clustering method such as k-means clustering may be employed for classification of the N0 candidate pieces of music.

Furthermore, it is possible to previously generate a hash table in which hash values of features (e.g. duration feature $T_R$) for the N0 candidate pieces of music are registered, and to select N reference pieces of music by the music selector 42 from the N0 candidate pieces of music in the hash table using a hash value substituting for the feature of the designated sequence of notes $S_Q$ as a search key. In addition, a configuration in which the N0 candidate pieces of music are previously classified into genres and the music selector 42 selects candidate pieces of music corresponding to a genre selected by manipulation of the input unit 18 by the user as reference pieces of music may be employed.

(8) As is understood from FIG. 14, it is possible to evaluate the correlation between the designated sequence of notes $S_Q$ and the reference sequence of notes $S_R$ with high accuracy according to the configuration in which the similarity index Z[n] is calculated based on the similarity index X[n] and the similarity index Y[n] even when a tolerance interval is not set (configuration 4), compared to a configuration in which only the similarity index X[n] is used (configuration 2). Accordingly, to solve the problem that high-accuracy evaluation is not achieved in a configuration in which only the similarity index X[n] is used (e.g. non-patent reference 1), a configuration (configuration 4 of FIG. 14) in which the similarity index Z[n] based on the similarity index X[b] and the similarity index Y[n] is calculated without setting the tolerance intervals ($\alpha$[m1], a [m2]) may be employed.

(9) While the duration features T ($T_Q$, $T_R$) corresponding to element values t[c] of 12 pitch classes corresponding to different notes (12 semitones) are calculated in the fourth embodiment, the number of pitch classes (number of element values t[c]) and a pitch classification method may be appropriately modified. For example, the number of pitch classes may be set to a value which exceeds 12 (e.g. 24, 36 or 48) or set to a value less than 12. Furthermore, pitch classes may be set for each range. For example, 12 pitch classes respectively corresponding to 12 semitones belonging to each odd-numbered octave from among a plurality of octaves and 12 pitch classes respectively corresponding to 12 semitones belonging to each even-numbered octave may be individually set (and thus a total of 24 element values t[1] to t[24] is calculated for each unit interval F). As is understood from the above description, a pitch class refers to a range (classification) including at least two pitches in the same pitch name and the number of pitch classes and pitch classification method are not limited to the disclosed embodiments.

(10) While the designated sequence of notes $S_Q$ designated by the user is compared with the reference sequence of notes $S_R$ stored in the storage unit 14 in the above-described embodiments, a predetermined process may be performed on the designated sequence of notes $S_Q$ and the reference sequence of notes $S_R$ before (or during) comparison of the designated sequence of notes $S_Q$ with the reference sequence of notes $S_R$. Specifically, pitches of one of or both the designated sequence of notes $S_Q$ and the reference sequence of notes $S_R$ may be changed (modulated or transposed and shifted on an octave basis, for example). When the designated sequence of notes $S_Q$ has been shifted with respect to the reference sequence of notes $S_R$, pitches of the designated sequence of notes $S_Q$ and the reference sequence of notes $S_R$ may be sequentially changed.

For example, it is possible to add or subtract a predetermined value to/from the pitches (note numbers) of the designated sequence of notes $S_Q$ and the reference sequence of notes $S_R$. It is preferable to change the pitches of the designated sequence of notes $S_Q$ and the reference sequence of notes $S_R$ such that a pitch corresponding to a specific note (e.g. first note) v[m1] in the designated sequence of notes $S_Q$ equals a pitch corresponding to a specific note (e.g. first note) v[m2] in the reference sequence of notes $S_R$. Furthermore, it may be possible to change the pitches of the designated sequence of notes $S_Q$ and the reference sequence of notes $S_R$ such that the note v[m1] corresponds to the note v[m2] only when the note v[m1] in the designated sequence of notes $S_Q$ and the note v[m2] in the reference sequence of notes $S_R$ are in a predetermined relation (e.g. when a pitch difference corresponds to an integer multiple of an octave). According to the above configurations, it is possible to achieve retrieval with high accuracy even when the pitches of the designated note row $S_Q$ and the reference sequence of notes $S_R$ are changed on an octave basis.

If the pitches of the designated sequence of notes $S_Q$ are represented by information (e.g. MIDI note numbers) including indication of an octave, the pitches of the designated sequence of notes $S_Q$ and the reference sequence of notes $S_R$ may be compared with each other after octave indication is eliminated. For example, when the designated sequence of notes $S_Q$ is represented by a time series of pitches including indication (a numerical value of "2" or "3" added to a symbol indicating a scale) of octaves, such as {C2, E2, G2, A#2, C#}, the designated sequence of notes $S_Q$ is changed into a format having no octave indication, such as {C, E, G, A#, C}, and then compared with the reference sequence of notes $S_R$ in a format including no octave indication.

(11) While reference pieces of music are provided to the user in the order based on the similarity index Z[n] (similarity index X[n] in the first, second and third embodiments) in the above-described embodiments, a method of using analysis results (Z[n], X[n]) is not limitative. For example, it is possible to employ a configuration (music search apparatus) in which only one reference piece of music (that is, reference piece of music most similar to the designated sequence of notes $S_Q$) corresponding to a maximum similarity index and a configuration in which play sound of one reference piece of music corresponding to the maximum similarity index is reproduced (and thus the display controller 24 can be omitted). In addition, while the similarity index (X[n], Z[n]) is calculated for each of a plurality of reference pieces of music in order to search N reference pieces of music for a piece of music intended by the user in the above-described embodiments, the similarity index may not be calculated for each of the plurality of reference pieces of music. That is, the present invention can be implemented as an apparatus for evaluating similarity between the designated sequence of notes $S_Q$ and the reference sequence of notes $S_R$) by defining a similarity index between the reference sequence of notes $S_R$ of one reference piece of music and the designated sequence of notes $S_Q$. As is understood from the above description, the present invention relates to an apparatus (music analysis apparatus) for analyzing music (a sequence of notes), and a music search apparatus is an example of the music analysis apparatus.

(12) The music analysis apparatus 100 (100A, 100B and 100C) can be implemented as a server device communicating with a terminal such as a cellular phone, personal computer, etc. That is, the music analysis apparatus 100 receives the designated sequence of notes $S_Q$ indicated by the user through the input unit 18 of a terminal, analyzes a correlation between the designated sequence of notes $S_Q$ and the reference sequence of notes $S_R$ and displays the analysis result on the display unit 16 of the terminal. As is understood from the above description, the input unit 18 and the display unit 16 in the above-described embodiments can be omitted from the music analysis apparatus 100.

What is claimed is:

1. A music analysis apparatus comprising:
a first analyzer configured to calculate a first similarity index based on an edit distance between a designated sequence of notes designated by a user and a reference sequence of notes of a reference piece of music,
wherein the first analyzer calculates the edit distance by setting a substitution cost between a first note in the designated sequence of notes and a second note in the reference sequence of notes to a first value when one of the first note and the second note corresponds to any of a plurality of notes contained in a tolerance interval containing the other of the first note and the second note, and by setting the substitution cost to a second value different from the first value when one of the first note and the second note does not correspond to any of the plurality of notes contained in the tolerance interval.

2. The music analysis apparatus according to claim 1, wherein the first analyzer calculates the first similarity index based on an edit distance when the tolerance interval containing the first note is set in the designated sequence of notes and an edit distance when the tolerance interval containing the second note is set in the reference sequence of notes.

3. The music analysis apparatus according to claim 1, wherein the first analyzer calculates a plurality of basic values based on a plurality of edit distances indicating respective similarities between the designated sequence of notes and a plurality of sub reference sequences of notes, which are sequentially selected from the reference sequence of notes such that a position of each sub reference sequence of notes shifts relative to the designated sequence of notes along a time axis, and selects a basic value indicating a maximum similarity between the sub reference sequence of notes and the designated sequence of notes as the first similarity index.

4. The music analysis apparatus according to claim 1, further comprising a music selector configured to select a plurality of reference pieces of music from a plurality of candidate pieces of music,
wherein the first analyzer calculates the first similarity index for each of the reference pieces of music selected by the music selector.

5. The music analysis apparatus according to claim 1, further comprising:
a feature calculator configured to divide the designated sequence of notes into a plurality of unit intervals in a time domain and divide the reference sequence of notes into a plurality of unit intervals in manner parallel to the designated sequence of notes, and further configured to calculate a duration feature for each unit interval based on each sum of durations of notes belonging to each of pitch classes within the unit interval and a total sum of durations of all notes belonging to the unit interval;
a second analyzer configured to calculate a second similarity index by comparing a duration feature of each unit interval of the designated sequence of notes with a duration feature of each unit interval of the reference sequence of notes; and
an index calculator configured to calculate a third similarity index based on the first similarity index calculated by the first analyzer and the second similarity index calculated by the second analyzer.

6. A music analysis method comprising:
a first step of determining whether or not one of a first note in a designated sequence of notes designated by a user and a second note in a reference sequence of notes of a reference piece of music corresponds to any of a plurality of notes contained in a tolerance interval containing the other of the first note and the second note;
a second step of setting a substitution cost between the first note and the second note to a first value when one of the first note and the second note corresponds to any of the plurality of notes contained in the tolerance interval, and setting the substitution cost to a second value different from the first value when one of the first note and the second note does not correspond to any of the plurality of notes contained in the tolerance interval;
a third step of calculating an edit distance between the designated sequence of notes and the reference sequence of notes based on the substitution cost set through the first and second steps; and
a fourth step of calculating a first similarity index based on the edit distance, the first similarity index indicating a degree of similarity between the designated sequence of notes and the reference sequence of notes.

7. The music analysis method according to claim 6, wherein the fourth step calculates the first similarity index based on an edit distance when the tolerance interval containing the first note is set in the designated sequence of notes and an edit distance when the tolerance interval containing the second note is set in the reference sequence of notes.

8. The music analysis method according to claim 6, further comprising a fifth step of sequentially selecting a plurality of sub reference sequences of notes from the reference sequence of notes such that a position of each sub reference sequence of notes shifts relative to the designated sequence of notes along a time axis, and calculating a plurality of basic values based on a plurality of edit distances indicating respective similarities between the designated sequence of notes and the plurality of sub reference sequences of notes, each edit distance being calculated by the first, second and third steps, wherein the fourth step selects a basic value indicating a maximum similarity between the sub reference sequence of notes and the designated sequence of notes as the first similarity index.

9. The music analysis method according to claim 6, further comprising a sixth step of selecting a plurality of reference pieces of music from a plurality of candidate pieces of music, wherein the first through fourth steps are performed for each of the selected reference pieces of music so that the first similarity index is calculated for each of the selected reference pieces of music.

10. The music analysis method according to claim 6, further comprising:
   a seventh step of dividing the designated sequence of notes into a plurality of unit intervals in a time domain and dividing the reference sequence of notes into a plurality of unit intervals in manner parallel to the designated sequence of notes, and calculating a duration feature for each unit interval based on each sum of durations of notes belonging to each of pitch classes within the unit interval and a total sum of durations of all notes belonging to the unit interval;
   an eighth step of calculating a second similarity index by comparing a duration feature of each unit interval of the designated sequence of notes with a duration feature of each unit interval of the reference sequence of notes; and
   a ninth step of calculating a third similarity index based on the first similarity index and the second similarity index.

11. A music analysis apparatus comprising:
   a first analyzer configured to calculate a first similarity index based on an edit distance between a designated sequence of notes designated by a user and a reference sequence of notes of a reference piece of music;
   a feature calculator configured to divide the designated sequence of notes into a plurality of unit intervals in a time domain and divide the reference sequence of notes into a plurality of unit intervals in manner parallel to the designated sequence of notes, and further configured to calculate a duration feature for each unit interval based on each sum of durations of notes belonging to each of pitch classes within the unit interval and a total sum of durations of all notes belonging to the unit interval;
   a second analyzer configured to calculate a second similarity index by comparing a duration feature of each unit interval of the designated sequence of notes with a duration feature of each unit interval of the reference sequence of notes; and
   an index calculator configured to calculate a third similarity index based on the first similarity index calculated by the first analyzer and the second similarity index calculated by the second analyzer.

12. A music analysis method comprising:
   a first step of calculating a first similarity index based on an edit distance between a designated sequence of notes designated by a user and a reference sequence of notes of a reference piece of music;
   a second step of dividing the designated sequence of notes into a plurality of unit intervals in a time domain and dividing the reference sequence of notes into a plurality of unit intervals in manner parallel to the designated sequence of notes, and calculating a duration feature for each unit interval based on each sum of durations of notes belonging to each of pitch classes within the unit interval and a total sum of durations of all notes belonging to the unit interval;
   a third step of calculating a second similarity index by comparing a duration feature of each unit interval of the designated sequence of notes with a duration feature of each unit interval of the reference sequence of notes; and
   a fourth step of calculating a third similarity index based on the first similarity index and the second similarity index.

* * * * *